United States Patent
Vroomen et al.

(10) Patent No.: US 6,889,992 B2
(45) Date of Patent: May 10, 2005

(54) AERODYNAMIC BICYCLE FRAME

(75) Inventors: Gerard Vroomen, Heide (NL); Philip White, Toronto (CA)

(73) Assignee: Cervelo Cycles, Inc., Toronto (CA)

( * ) Notice: Subject to any disclaimer, the term of this patent is extended or adjusted under 35 U.S.C. 154(b) by 0 days.

(21) Appl. No.: 10/413,312

(22) Filed: Apr. 11, 2003

(65) Prior Publication Data

US 2004/0046352 A1 Mar. 11, 2004

Related U.S. Application Data

(63) Continuation-in-part of application No. 09/961,041, filed on Sep. 20, 2001, now abandoned.

(30) Foreign Application Priority Data

Sep. 20, 2000 (CA) .............................................. 2319985

(51) Int. Cl.[7] .............................................. B62K 21/12
(52) U.S. Cl. .................................... 280/274; 280/281.1
(58) Field of Search ................................. 280/274–277, 280/281.1, 283–286

(56) References Cited

U.S. PATENT DOCUMENTS

| 4,427,209 | A | * | 1/1984 | Morita | ..................... 280/281.1 |
|---|---|---|---|---|---|
| 4,453,730 | A | * | 6/1984 | Klose | ....................... 280/281.1 |
| 4,900,050 | A | | 2/1990 | Bishop et al. | |
| 4,941,674 | A | | 7/1990 | Trimble | |
| RE33,295 | E | * | 8/1990 | Trimble | ................... 280/281.1 |
| 4,982,975 | A | | 1/1991 | Trimble | |
| 5,772,227 | A | * | 6/1998 | Michail | ....................... 280/275 |
| 5,957,473 | A | | 9/1999 | Lawwill | |
| 6,036,213 | A | * | 3/2000 | Busby | ......................... 280/284 |

* cited by examiner

*Primary Examiner*—Lesley D. Morris
*Assistant Examiner*—L. Lum
(74) *Attorney, Agent, or Firm*—T D Foster; Thomas D. Foster

(57) ABSTRACT

There is provided a bicycle frame comprising a first tube; a second tube extending transversely from an upper region of the first tube; a third tube extending transversely and downwardly from a lower region of the first tube, and towards the same direction as the second tube; and a two-part tube joining the respective ends of the second and third tubes, the two-part tube having a straight upper part and a curved lower part, the straight upper part being substantially vertical and the curved lower part being curved longitudinally towards the first tube such as to conform to the curvature of a bicycle wheel. The upper part of the two-part tube is adapted to receive a post member therein, and a first and a second set of tubes extend at the respective ends the two-part tube and are each attached to drop.

15 Claims, 8 Drawing Sheets

PRIOR ART

Fig. 1(a)

PRIOR ART

AERODYNAMIC BICYCLE FRAME

This application is a continuation-in-part of U.S. application Ser. No. 09/961,041, filed Sep. 20, 2001, abandoned which claims priority to Canada application no. 2,319,985, filed Sep. 20, 2000.

FIELD OF THE INVENTION

The present invention relates generally to an aerodynamic bicycle frame. Particularly, the invention relates to a bicycle frame allowing for an optimal aerodynamic shielding on the upper portion of the rear wheel. More particularly, the invention relates to an aerodynamic bicycle frame to which a brake is removably attached, without reducing the aerodynamic efficiency of the frame.

BACKGROUND OF THE INVENTION

Figure 13:
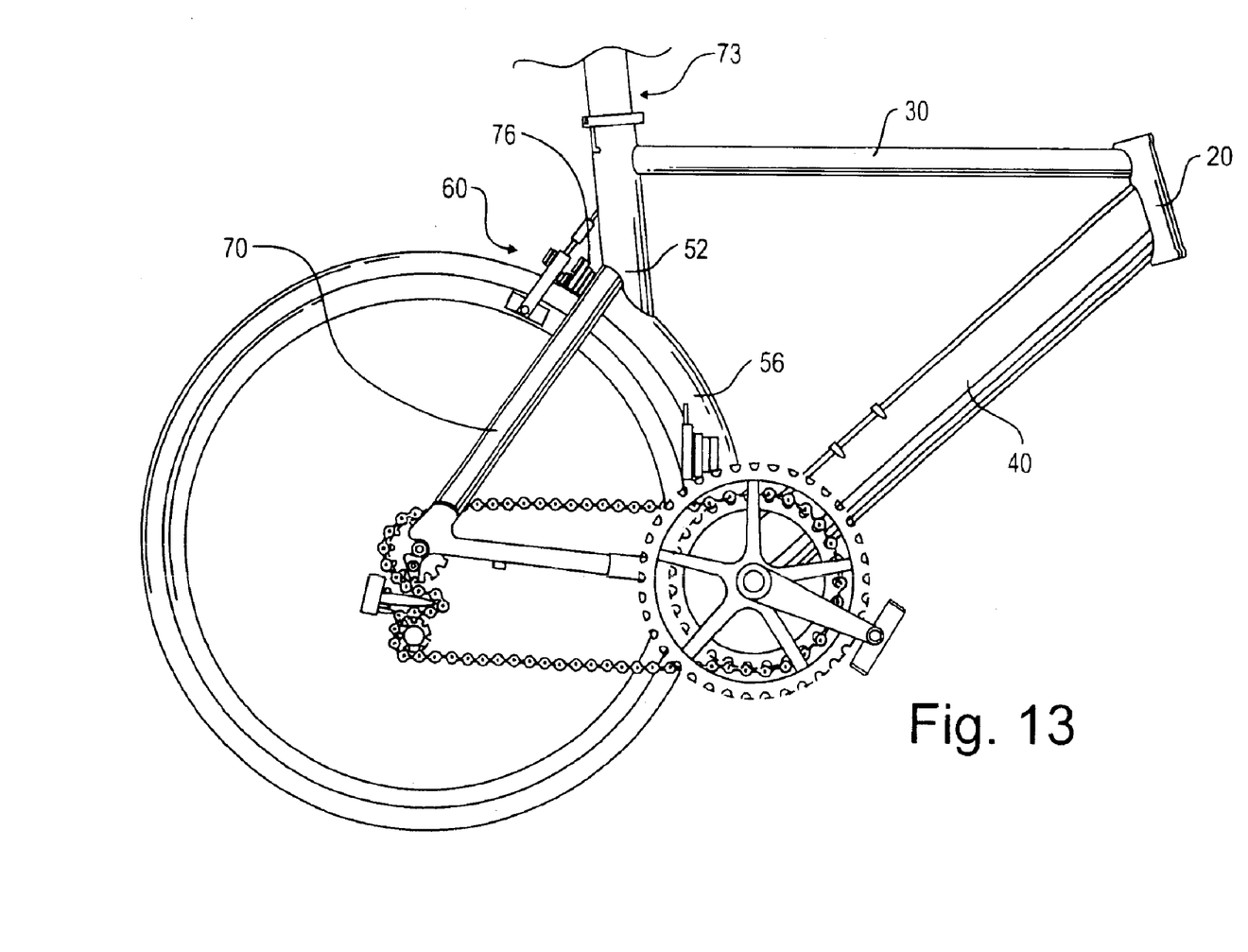
FIG. 13 is partial side view of the bicycle according to the invention, showing the close proximity of the tire to the trailing edge of the lower curved portion of the seat tube.

Conventional bicycle frames, as illustrated for example in FIG. 13 generally have a one-piece straight seat tube. Bicycle frames with a one-piece seat tube having a curved portion are also known in the art, as illustrated for example in U.S. Pat. No. 5,957,473 to Lawwill and U.S. Pat. No. 4,900,050 to Bishop et al.

It has been found advantageous to establish an aerodynamic shielding on the rear wheel of a bicycle, especially on the upper portion. Attempts to achieve this goal have been made by constructing bicycle frames with a straight seat tube having a recessed curved section. Unfortunately, this design does not allow for a full shielding of the upper portion of the rear wheel.

Figure 1A:
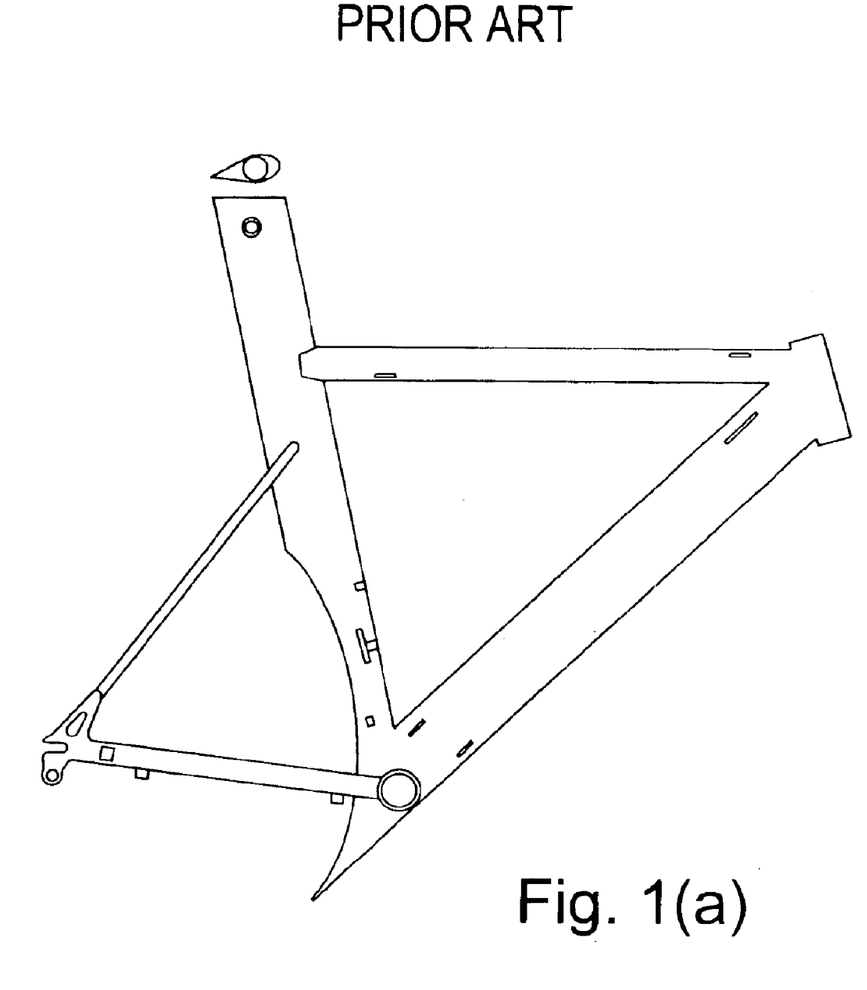
Figure 1B:
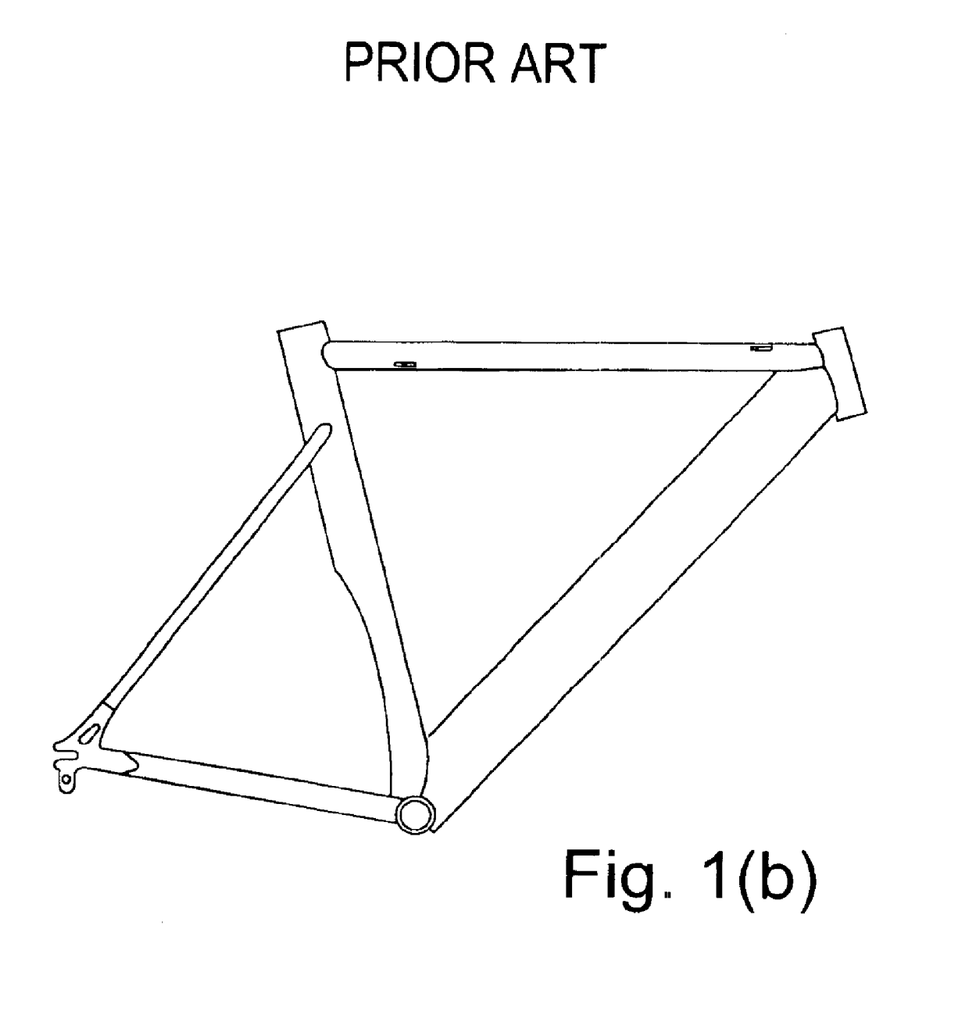
Figure 2:
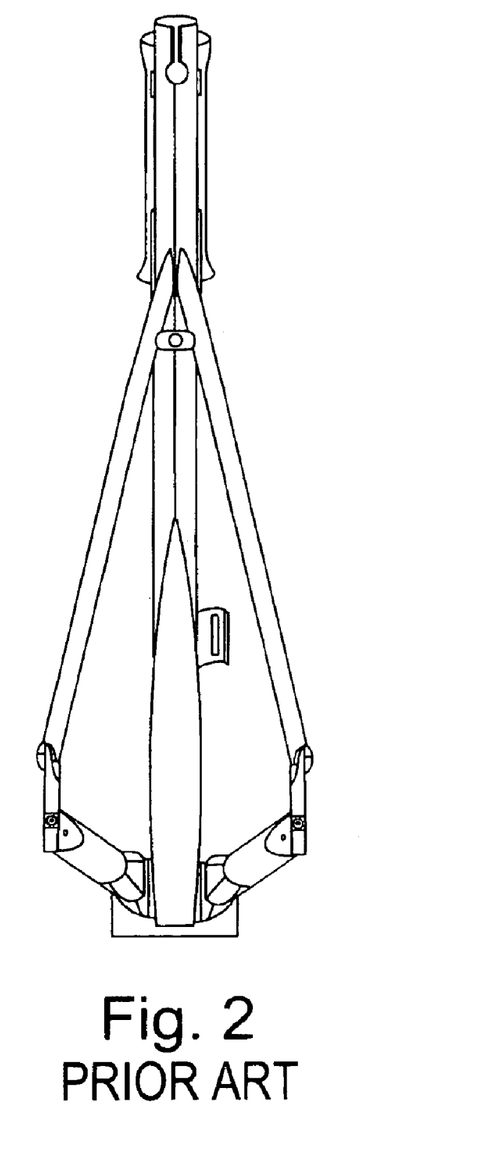
FIG. 2 is a rear view of the seat tube of a prior art aerodynamic bicycle frame.
Figure 3:
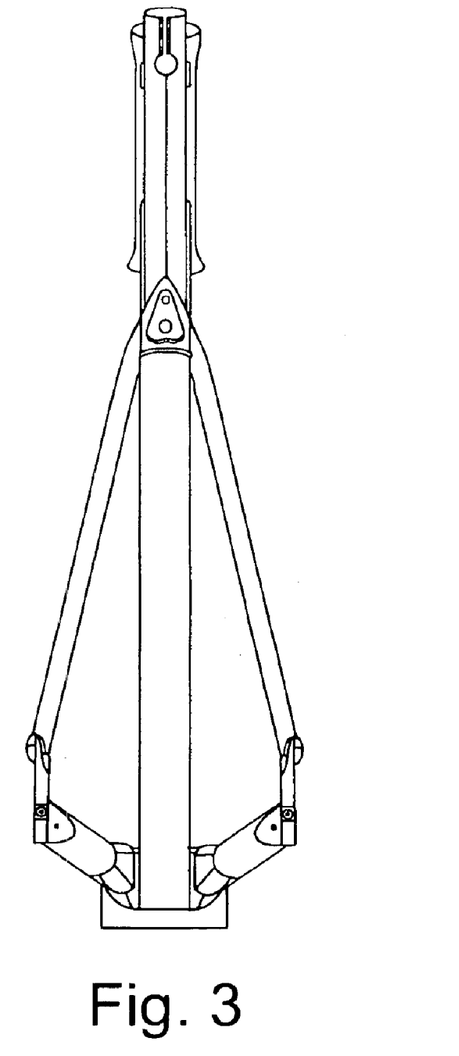
FIG. 3 is a rear view of the seat tube of the aerodynamic bicycle frame according to the invention.

Trimble in U.S. Pat. Nos. Re. 33,295; 4,941,674; and 4,982,975 discloses a bicycle frame made of composite material. The frame comprises a seat tube having a curved section which is cut into a one-piece straight seat tube. Such seat tube is also illustrated in FIGS. 1(a) and 1(b). The resulted design of the bicycle frame according to Trimble is that of a traditional "double diamond" frame, which has two open triangles with a common side. The curved section of Trimble's seat tube does not allow, however for a full coverage of the upper portion of the rear wheel and thus an optimal aerodynamic shielding is not achieved.

Therefore, there remains a need for a bicycle frame allowing for a maximum aerodynamic shielding and reduced aerodynamic drag. There is also a need for an aerodynamic frame having a brake which is removably attached therefrom without reducing the aerodynamic efficiency of the frame, or its strength or stiffness. Indeed, in frames with recessed curved cutouts it becomes very difficult to attach a brake of conventional design because access to the rear of the brake is required to affix it. A large gap must therefore be left around the back of the brake for access to attach and tighten the brake to the frame. This large gap reduces the aerodynamic efficiency of the frame. In other designs, access holes are provided in the frame for attachment of the brake thereto. This results in adding weight as well as costs, and the stiffness and structural integrity of the frame are reduced.

SUMMARY OF THE INVENTION

It is an object of the present invention to provide a bicycle frame allowing for an optimal aerodynamic shielding on the upper portion of the rear wheel.

It is also an object of the invention to provide an aerodynamic bicycle frame allowing for a reduced aerodynamic drag.

It is yet another object of the invention to provide an aerodynamic bicycle frame which integrates a brake, without reducing the aerodynamic efficiency of the frame.

In accordance with the invention, there is provided a bicycle frame comprising a bicycle frame comprising: a first tube; a second tube extending transversely from an upper region of the first tube, in a direction; a third tube extending transversely and downwardly from a lower region of the first tube, and towards the same direction as the second tube; and a two-part tube joining the respective ends of the second and third tubes, the two-part tube having a straight upper part and a curved lower part, the straight upper part being substantially vertical and the curved lower part being curved longitudinally towards the first tube such as to conform to the curvature of a bicycle wheel.

In accordance with a preferred embodiment, the two-part tube can be aerodynamic shaped and its upper part can be adapted to receive therein a post member.

The bicycle frame according to the invention may comprise a first set of tubes extending from the two-part tube at a junction between the upper and the lower parts. The first set of tubes are attached at its other end to dropout means located at the center of the wheel. In addition, the frame may also comprise a second set of tubes extending from a lower end of the two-part tube and attached at their other ends to dropout means located at the center of the wheel. Preferably, the second set of tubes may be attached at a junction between the upper and the lower parts.

In accordance with a preferred embodiment, the lower part can be curved in both horizontal and vertical planes in order to conform to the curvature of the bicycle wheel.

A preferred embodiment of the bicycle frame can include brake means which is removably attached to the two-part tube at a junction between the upper and the lower parts. More preferably, the brake means can include a brake mounted to a plate.

BRIEF DESCRIPTION OF THE DRAWINGS

These and other advantages of the invention will become apparent upon reading the following detailed description and upon referring to the drawings in which:

FIGS. 1(a & b) is a side view of a prior art aerodynamic bicycle frames;

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 4:
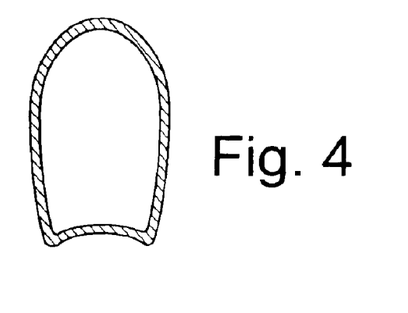
FIG. 4 is a cross section of the lower section of the seat tube of the aerodynamic bicycle frame according to the invention.
Figure 5:
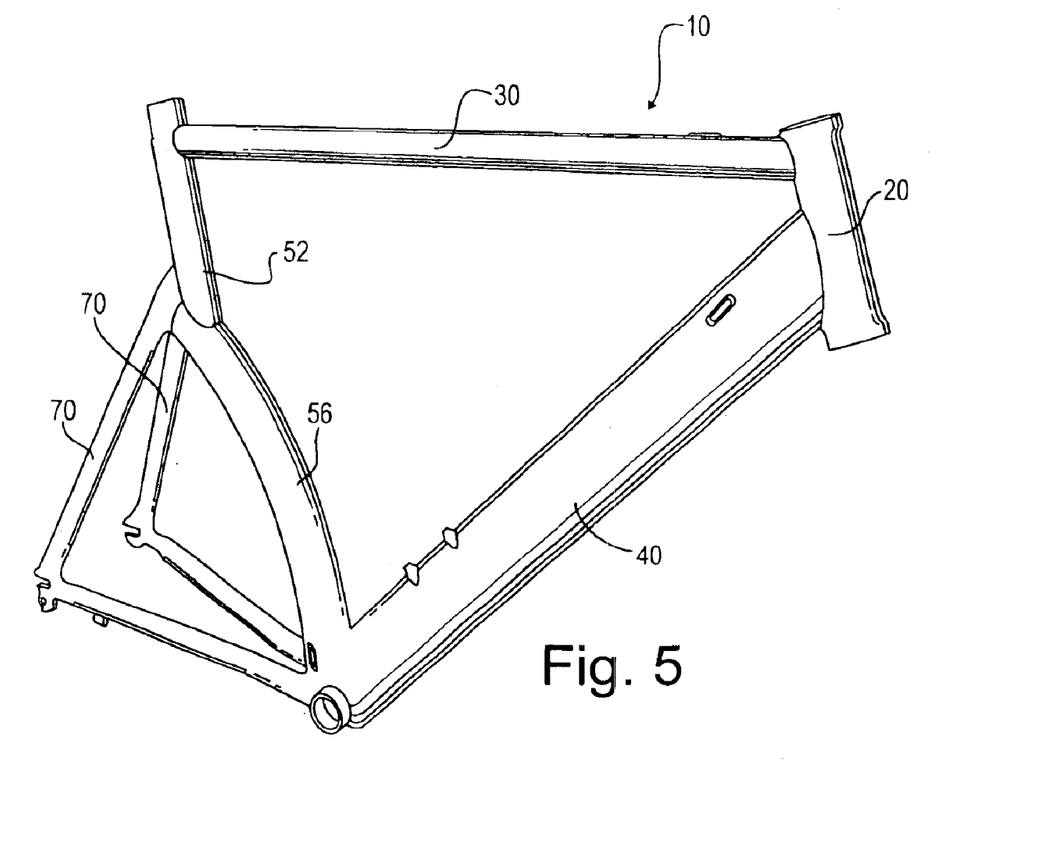
FIG. 5 is a side view of the aerodynamic bicycle frame according to the invention, showing the seat post-seat stay junction.
Figure 6:
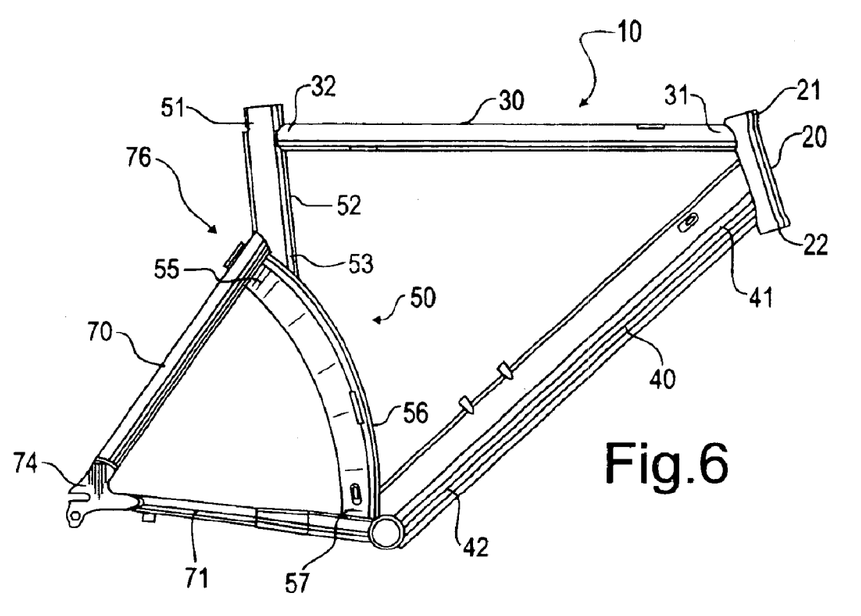
FIGS. 6 and 7 are opposite side views of the aerodynamic bicycle frame according to the invention.
Figure 7:
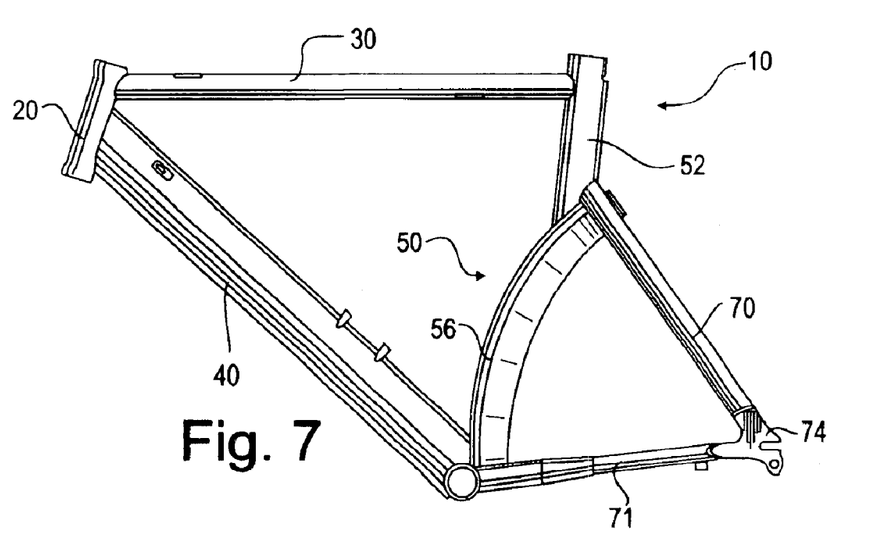
Figure 8:
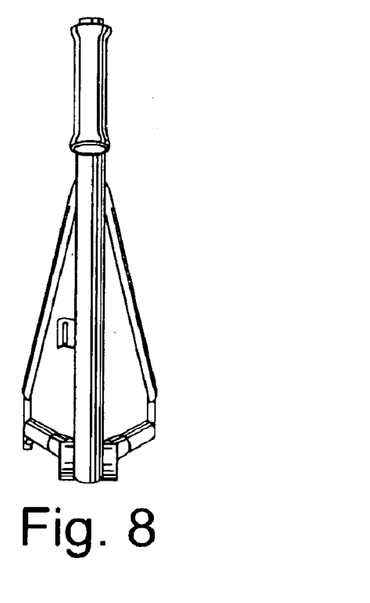
FIG. 8 is a front view of the aerodynamic bicycle frame according to the invention.
Figure 9:
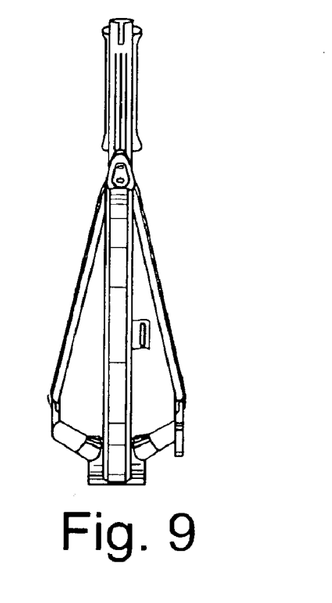
FIG. 9 is a rear view of the aerodynamic bicycle frame according to invention.
Figure 10:
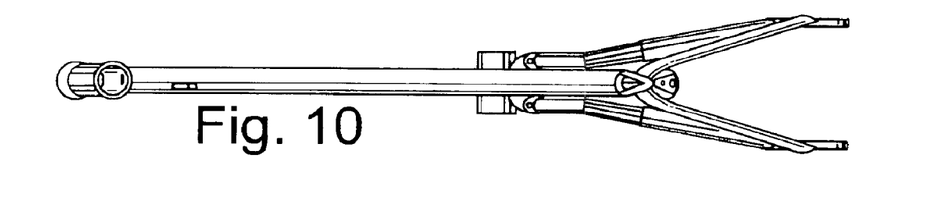
FIG. 10 is a top view of the aerodynamic bicycle frame according to invention.
Figure 11:
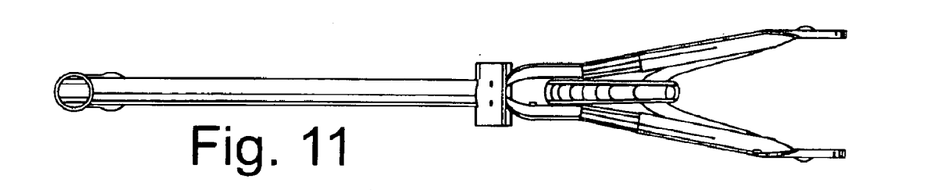
FIG. 11 is a bottom view of the aerodynamic bicycle frame according to invention.
Figure 12:
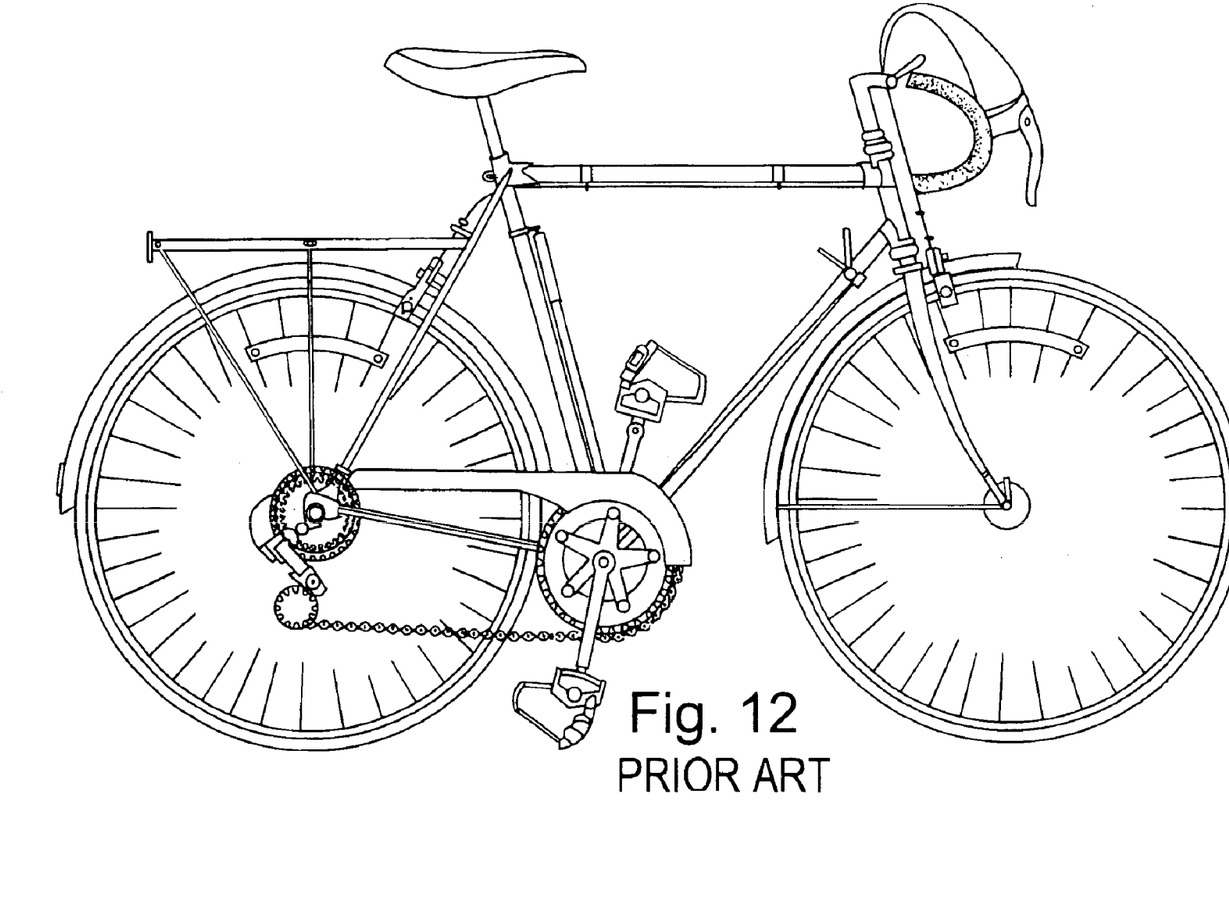
FIG. 12 is a side view of a prior art bicycle showing the various parts of the whole bicycle.

Features of the bicycle frame according to this invention are illustrated in FIGS. 3 through 11 and 13. Referring to FIG. 6, the bicycle frame 10 comprises a head tube 20, a top tube 30, a down tube 40 and a seat tube 50. The head tube 20 extends obliquely between its upper end 21 and its lower end 22, and forms an angle of about 0 to 30 degrees with the vertical. In a preferred embodiment of the invention, this angle is about 20 degrees. The top tube 30 is attached to the upper part 21 of the head tube at its first end 31 and extends substantially horizontally therefrom. The top tube may form an angle of about 0 to 15 degrees with the horizontal and can be sloped either upwardly or downwardly. In a preferred embodiment of the invention, this angle is 0 degree. The down tube 40 is attached at its first end 41 to the lower part of the head tube 22. The down tube extends transversely and downwardly, toward the same direction as the top tube. The seat tube 50 joins the second end of the top tube 32 and the second end of the down tube 42.

The seat tube 50 of the invention is composed of two parts: upper part 52 and a lower part 56. The upper part of the seat tube 52, is a substantially straight tube extending downwardly and substantially vertically from its upper end 51 to its lower end 53. Upper seat tube 52 forms an angle of about 0 to 20 degrees with the vertical. In a preferred embodiment of the invention, this angle is about 5 degrees. The lower part of the seat tube 56 is curved both longitudinally and transversely as illustrated in FIG. 4, and extends from its upper end 55 between its lower end 57. The seat tube 50 can be made of two pieces (upper part 52 and lower part 56) welded together or can be made in one piece in the shape according to the invention.

In a preferred embodiment, the two-part seat tube 50 is aero shaped and its interior is adapted to receive therein a seat post 73 (FIG. 13). The seat post 73 may also be aerodynamically shaped and adapted to slide inside the aero shaped upper seat tube 52, matching its interior shape. Alternatively, the aero shaped seat post 73 may not matched the interior of tube 52. The aerodynamic shape of the seat post reduces the aerodynamic drag of the frame and improves its performance. It should be noted that the two-part seat tube 50 as well as the seat post 73 may also, each separately have any other suitable shape. The cross section of the two parts of the seat tube may also be different.

The upper seat tube 52 of the bicycle frame according to a preferred embodiment of the invention is very close to vertical (as opposed to mostly oblique as in the prior art). Therefore, the seat post 73 and upper seat tube 52 drop substantially vertically towards the wheel from the saddle and the lower curved part 56 thus comes further up and back on the wheel, resulting in a greater coverage of the upper portion of the rear wheel and the aerodynamic drag is reduced. In addition, given the fact that the seat post and upper seat tube 52 are farther back than on conventional designs, the center of pressure of the bicycle is moved rearward, resulting in better stability.

The lower longitudinally curved part 56 of the seat tube is transversely curved as shown in FIG. 4 and is designed to act as a fairing, and reduces the aerodynamic drag of the rotating rear wheel and tire assembly. FIG. 4 illustrates a cross section of the lower part 56 of the seat tube.

The bicycle frame according to the invention also comprises seat stays 70 which extend from the junction between upper seat tube 52 and the lower curved part 56. The frame also comprises chain stays 71 which extend from the lower part 57 of the curved lower part 56. Seat stays 70 and chain stays 71 meet indirectly at the center of the wheel, as better explained below.

In a preferred embodiment of the bicycle frame according to the invention, rearward facing horizontal dropout means 74 is provided at the center of the wheel. As can be seen for example in FIGS. 6 and 7, seat stay 70 and chain stay 71 are each attached thereto. The dropouts allow the wheel to be adjusted as close as possible to the transverse curved portion of the lower part of the seat tube 56. This results in an optimal aerodynamic shielding and a reduced aerodynamic drag. The rearward facing horizontal dropouts also allow the user to use different sizes of tires and still optimize the aerodynamic performance of the bicycle.

It should be noted that the bicycle frame according to the invention differs significantly from the traditional "double diamond" frame shape, which generally has two open triangles with a common side. In contrast, the front portion of the bicycle frame of the invention has four sides and incorporates a curved member. The rear portion has only 3 sides and one is a curve. In addition, the seat stays 70 do not intersect at the vertex joining the seat tube 50 and the top tube 32 as in most other traditional "double diamond" frame designs, but rather at the junction between the upper and lower seat tubes 52 and 56. This dropped seat stay design improves the aerodynamic performance and stiffness of the frame.

The bicycle frame according to a preferred embodiment of the invention is constructed from custom aluminum extrusions and meets the latest UCI regulations. It should be noted that any suitable material, such as metallic, composite or the like material can be used.

Referring to FIGS. 5 and 13, the bicycle frame according to a preferred embodiment of the invention is provided with brake means 60, which is integrated at the junction between the upper seat tube 52 and the seat stays 70. The brake means is constituted of a rear brake of conventional design that is bolted to a small plate 76, and the plate is subsequently bolted to the rear of the frame. This brake and brake plate design provides the cleanest aerodynamic solution by not requiring a large gap between the tire and frame for access to the brake attachment, and it does not degrade the frame stiffness or strength with access holes or other compromises.

Thus, it is apparent that there has been provided in accordance with the invention an aerodynamic bicycle frame that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A bicycle frame comprising:
   a first tube;
   a second tube extending transversely from an upper region of said first tube, in a direction;

a third tube extending transversely and downwardly from a lower region of said first tube, and towards a same direction as said second tube; and a two-part tube joining respective ends of said second and third tubes, said two-part tube having a straight upper part and a curved lower part, said straight upper part being substantially vertical and said curved lower part being curved longitudinally towards said first tube such as to conform to a curvature of a bicycle wheel.

2. The bicycle frame according to claim 1, wherein said two-part tube is aerodynamically shaped and said upper part is adapted to receive therein a post member.

3. The bicycle frame according to claim 2, wherein said post member is aerodynamically shaped.

4. The bicycle frame according to claim 1, further comprising a first set of tubes extending from said two-part tube.

5. The bicycle frame according to claim 4, wherein said first set of tubes extend from said two-part tube at a junction between said upper and lower parts, said first set of tubes being attached at their other end to dropout means located at a center of the wheel.

6. The bicycle frame according to claim 1, wherein said upper and lower parts are welded together.

7. The bicycle frame according to claim 1, wherein said upper and lower parts constitute a one piece member.

8. The bicycle frame according to claim 1, wherein said upper part forms an angle of about 0 to 20 degrees with the vertical.

9. The bicycle frame according to claim 8, wherein said angle is about 5 degrees.

10. The bicycle frame according to claim 4 further comprising a second set of tubes extending from a lower end of said two-part tube, said second set of tubes being attached at their other ends to dropout means located at a center of the wheel.

11. The bicycle frame according to claim 4 further comprising brake means removably attached to said first set of tubes.

12. The bicycle frame according to claim 1 further comprising brake means removably attached to said two-part tube at a junction between said upper and lower parts.

13. The bicycle frame according to claim 12, wherein said brake means includes a brake mounted to a plate.

14. The bicycle frame according to claim 1, wherein said lower part is transversely curved in both horizontal and vertical planes.

15. The bicycle frame according to claim 4 or 10, wherein said first and second sets of tubes are each a pair of substantially parallel tubes.

* * * * *